(No Model.)
C. MILLER.
METHOD OF UNITING THE ENDS OF BAND SAWS.
No. 361,536. Patented Apr. 19, 1887.
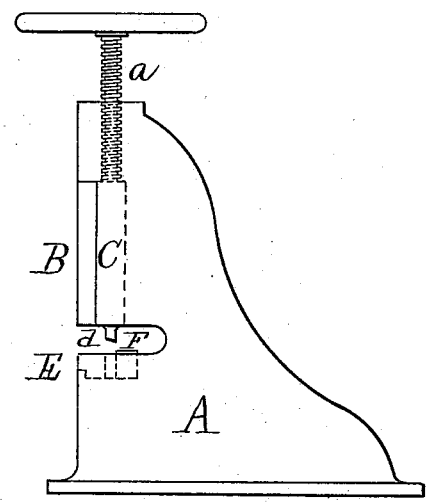
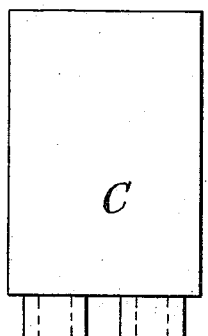
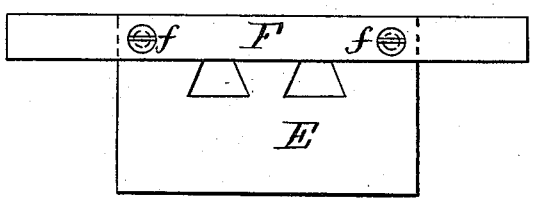
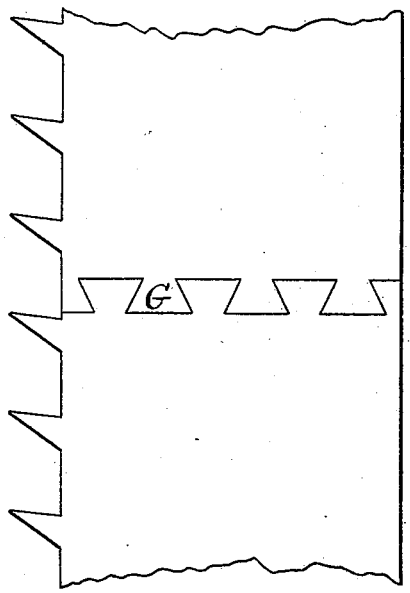
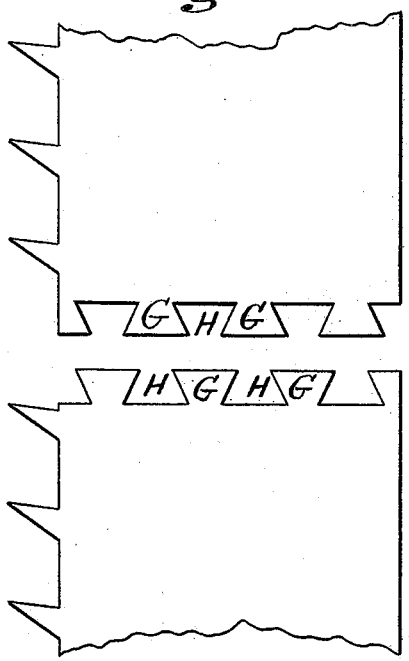
Witnesses.
Fred E. Tasker.
Charles J. Stockman.
Inventor.
Charles Miller,
per John C. Tasker atty.

UNITED STATES PATENT OFFICE.

CHARLES MILLER, OF MUSKEGON, MICHIGAN.

METHOD OF UNITING THE ENDS OF BAND-SAWS.

SPECIFICATION forming part of Letters Patent No. 361,536, dated April 19, 1887.

Application filed January 15, 1887. Serial No. 224,397. (No model.)

*To all whom it may concern:*

Be it known that I, CHARLES MILLER, a citizen of the United States, residing at Muskegon, in the county of Muskegon and State of Michigan, have invented certain new and useful Improvements in the Method of Uniting the Ends of Band-Saws; and I do hereby declare the following to be a full, clear, and exact description of the invention, such as will enable others skilled in the art to which it appertains to make and use the same.

This invention relates to the class of mechanism commonly known as "endless" or "band" saws, which are used in saw-mills for cutting lumber into pieces of different thicknesses.

Band-saws as now in use are subjected to severe strains during their motion on the machine, and are therefore liable, from this, as well as from many other causes, to be broken or rent asunder. When this occurs, the ordinary mode of proceeding to repair the saw is as follows: The two ends of the saw are first properly squared at right angles with the line of the teeth. Each end is then filed beveling across its whole extent, said ends being respectively filed beveling in opposite directions to each other. The two beveled parts are then brought into contact and brazed together. When this operation is completed, the saw is once more an endless belt and again ready for use. It will be obvious to any person skilled in the art that the joining together of the parts of an endless saw, in the manner already described, is not only a tedious and costly operation, but in a great majority of instances results in making a defective joint, owing to the nice adjustment required, which not only necessitates that the beveled edges shall be exactly similar to each other, but compels the exercise of great care in lapping the edges together, so that when the brazing is completed the thickness of the joint may exactly correspond with that of the rest of the saw. These difficulties are entirely overcome by the use of my improved method, the object of which is to secure equality of thickness, great strength and durability, and a perfect alignment of the parts, coupled with a vast reduction of cost in repairing a saw; and the invention consists in the method to be herein described for uniting the ends of the saw; and also, it consists in an improved punch for effecting this union, all of which will be hereinafter fully described, and then more particularly pointed out in the claims.

In the annexed drawings, which illustrate one way of carrying out my improved method of jointing saws, Figure 1 is a side elevation of an improved form of punching-machine which I employ in making saw-joints after my improved method. Fig. 2 is a front elevation of the punch-stock with its punch and guide. Fig. 3 is a plan view of the die and the guide-plate. Fig. 4 is a plan view of the two ends of the saw after being punched and ready for jointing. Fig. 5 represents the completed saw after the parts have been jointed and brazed and made ready for use.

Similar letters of reference designate corresponding parts.

In carrying out my invention the two ends of the saw are first squared at right angles to the line of the teeth, and then the said ends are provided with interlocking dovetailing projections and recesses, or with projections and recesses of some other convenient and effective interlocking form. In order to cut out the dovetailing projections and recesses, I have here illustrated a form of punching-machine which I preferably use.

A represents the main frame of this machine, and $a$ the screw with its hand-wheel, by means of which power is applied to the punch.

B indicates a plate which is secured to the body of the machine and is used to keep the punch in position.

C is the punch-stock. (See Figs. 1 and 2.) Its main portion may be of any desired form. On the lower end of this main portion is formed the punch $d$ and the guide $d'$. (See Fig. 2.) The guide $d'$, which is of exactly the same form as the punch, extends sufficiently below the punch to enable it to enter the die before the punch reaches the saw-plate. The punch $d$ and guide $d'$ are beveled on the under side, as seen in Fig. 1, the longest side being toward the end of the saw-plate which is to be punched. This gives a shearing cut when the machine is being operated, and reduces the power required to punch the plate to the minimum and enables the punching operation to be performed without liability of cracking the plate.

E denotes the die-plate, and is provided with two depressions or slots extending through it. These slots correspond exactly in shape and position to the punch $d$ and guide $d'$, and are properly arranged and shaped to allow the punching to be freely performed. To the upper side of the die-plate E is fastened the guide-plate F, by means of screws $f$ or other suitable devices. This guide-plate is made considerably longer than the die-plate, as shown, and is used for the purpose of guiding the end of the saw while it is being punched, so that the interlocking projections may be perfectly straight-edged and in line with each other.

An enlarged view of the die and guide plate is shown at Fig. 3, while its position in the machine is shown in Fig. 1.

Fig. 4 shows the two ends of the saw punched and ready to be united together. The projection G on each end exactly fits into the recess H on the opposite end, and as they are all punched with the same tool it is evident that the whole series must interlock in a perfectly-straight line.

Fig. 5 shows the saw completed and ready for use. The process of combining the two together is effected in the ordinary manner—viz., brazing the entire surface of the joint.

In carrying out the repairing of saws by this improved method the ends of the saw are squared at right angles to the line of the teeth. The saw is then placed against the guide-plate, which is fastened to the die, as already described. The punch is then brought into action. The guide shears out the first cut and is forced downward still farther until the punch shears out the second cut. The punch-stock is then raised, the saw moved sidewise, and the guide entered into the last-made cut. This operation is continued across the saw till the end is formed with a sufficient number of projections or recesses. In punching the other end of the saw it is only necessary to lay the joint together in a perfectly-straight line, mark off on one side the position of the first cut, place it directly beneath the punch, and proceed as already described in respect to the first end.

Having thus described my invention, what I claim as new, and desire to secure by Letters Patent, is—

1. The herein-described method of uniting the two ends of a band-saw, which consists in forming said ends with interlocking projections and recesses, then interlocking said ends and brazing them together, substantially as described.

2. The herein-described punching device, consisting of the main frame A, screw $a$, punch-stock C, having projecting punch $d$ and guide $d'$, the die-plate E, and the guide-plate F, secured to the die-plate, substantially as described.

3. In a punching-machine, the combination of the frame A, the punch-stock C, having punch $d$ and guide $d'$, of unequal lengths, and the die-plate E, having depressions or slots corresponding in size and arrangement with the punching projections, as described.

4. The combination of the frame A, punch-stock C, having punch $d$ and guide $d'$, of unequal lengths, the screw $a$, die-plate E, having depressions or slots corresponding to the punching projections, and the guide-plate F, secured to the die-plate, substantially as shown and described.

In testimony whereof I affix my signature in presence of two witnesses.

CHARLES MILLER.

Witnesses:
ROBERT WEIR,
D. J. MORIARTY.